C. A. PETERSEN.
SELF LUBRICATING BUSHING FOR PULLEYS.
APPLICATION FILED APR. 24, 1908.

902,831.

Patented Nov. 3, 1908.

2 SHEETS—SHEET 1.

WITNESSES:
J. W. Miller
J. Holzer

INVENTOR
CRISTIAN A. PETERSEN,
By Wm Bagger & Co.
Attorneys.

C. A. PETERSEN.
SELF LUBRICATING BUSHING FOR PULLEYS.
APPLICATION FILED APR. 24, 1908.
902,831.
Patented Nov. 3, 1908.
2 SHEETS—SHEET 2.
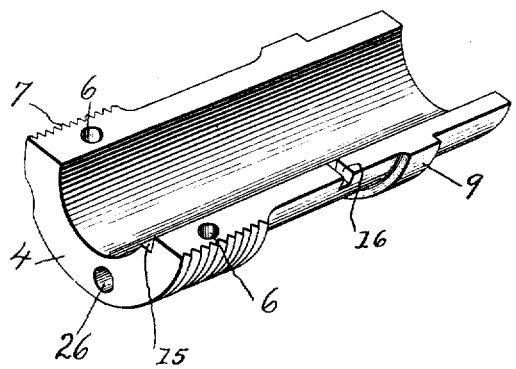
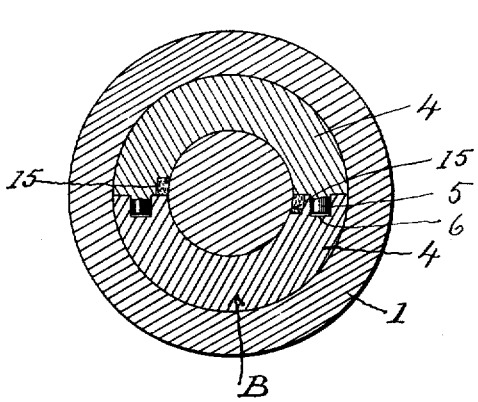
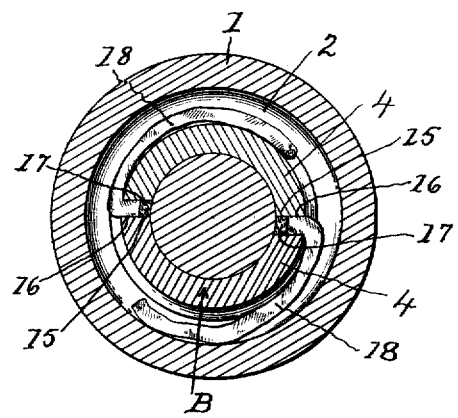
WITNESSES:
INVENTOR
CRISTIAN A. PETERSEN,
BY
Attorneys.

UNITED STATES PATENT OFFICE.

CRISTIAN ALFRED PETERSEN, OF LACONIA, NEW HAMPSHIRE.

SELF-LUBRICATING BUSHING FOR PULLEYS.

No. 902,831.  Specification of Letters Patent.  Patented Nov. 3, 1908.

Application filed April 24, 1908. Serial No. 429,004.

*To all whom it may concern:*

Be it known that I, CRISTIAN ALFRED PETERSEN, a subject of the King of Denmark, residing at Laconia, in the county of Belknap and State of New Hampshire, have invented certain new and useful Improvements in Self-Lubricating Bushings for Pulleys, &c., of which the following is a specification.

This invention relates to self lubricating bushings for loose pulleys, shaft hangers and the like; and the principal object of the invention is to provide a simple and convenient bushing, capable of being readily detached and applied and which in conjunction with related parts, such as the hub of a pulley, shall constitute an oil receptacle from which the lubricant may be readily conveyed and applied to the bearing.

Another object of the invention is to furnish a lubricating bushing of simple and improved construction which may be readily removed and replaced without entailing the necessity of removing the pulley from the shaft.

Other objects are to simplify and improve the construction and operation of this class of devices.

With these and other ends in view which will readily appear as the nature of the invention is better understood, the same consists in the improved construction and novel arrangement and combination of parts which will be hereafter fully described, and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to, when desired.

Figure 1:
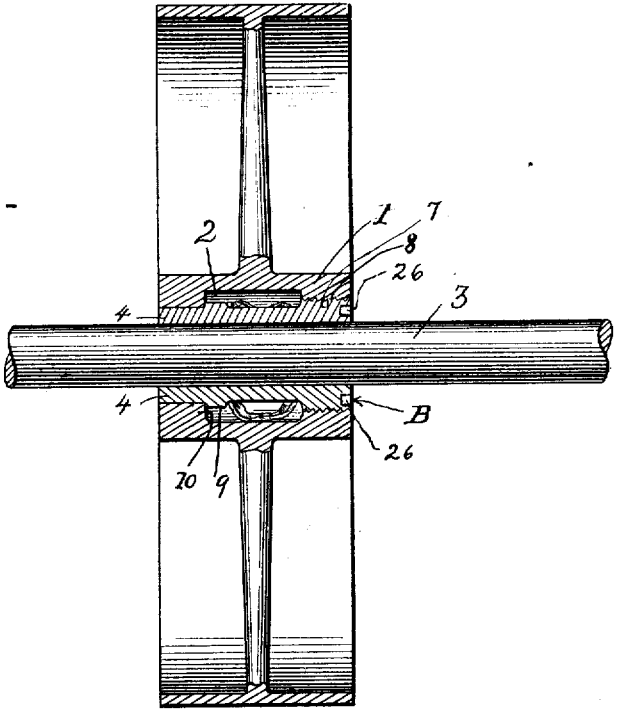
Figure 2:
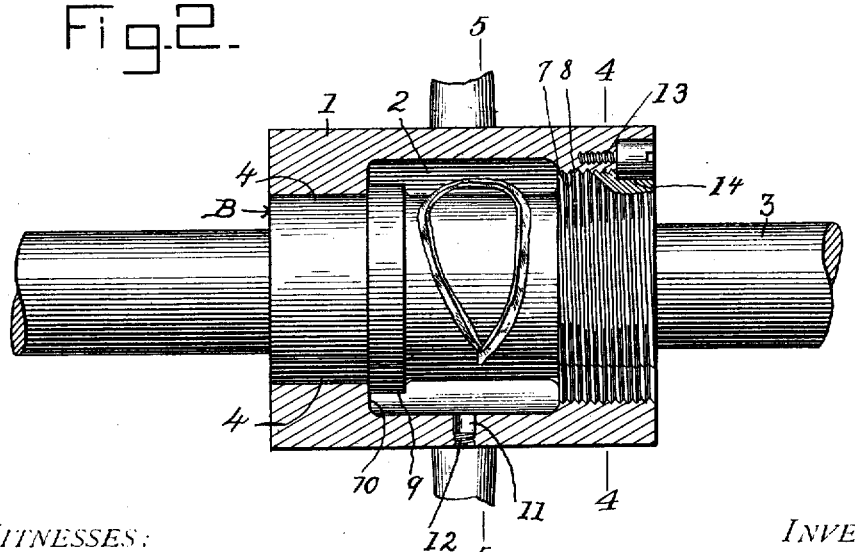

In the drawings—Figure 1— is a sectional view of a pulley equipped with the improved lubricating bushing. Fig. 2— is a sectional elevation, on a larger scale, of the hub portion of the pulley. Fig. 3— is a perspective detail view of one of the halves or members of the bushing. Fig. 4— is a transverse sectional view taken on the plane indicated by the line 4—4 in Fig. 2. Fig. 5— is a transverse sectional view taken on the plane indicated by the line 5—5 in Fig. 2.

Corresponding parts in the several figures are denoted by like characters of reference.

In the figures of the drawing the invention has been shown applied to the hub of a loose pulley, but it will be understood that the invention may be applied, with equally satisfactory results, to shaft hangers and to bearings of various descriptions, as will be obvious to those skilled in the art to which the invention appertains.

The hub, 1, of the pulley is cored to form an annular recess, 2, which constitutes a lubricant receptacle surrounding the bushing, B, which extends longitudinally through the hub. The bushing, which is bored longitudinally for the reception of the shaft, 3, is composed of two approximately semi-cylindrical parts or members, 4, 4, equipped along their meeting edges with pins or dowels, 5, and corresponding recesses, 6, to enable them to be tightly fitted together. The bushing is exteriorly screw-threaded at one end, as shown at 7, to engage a corresponding female thread, 8, at one end of the bore of the hub; and the bushing has an exterior annular collar, 9, adapted to abut upon an annular shoulder or offset, 10, formed interiorly upon the bore of the hub, so as to form a perfectly oil-tight joint.

The hub 1 has a filling aperture, 11, communicating with the oil receptacle 2, the outer end of said aperture being provided with a plug or closure, 12. Threaded into one end of the hub is a set screw, 13, the head of which overlaps and engages a recess, 14, in the end of the bushing, which latter will thus be secured against accidental displacement. The bushing is provided with diametrically opposite interior longitudinal grooves, 15, which may conveniently and appropriately be formed along the edges of the halves or members of said bushing, as will be clearly seen in Fig. 3 of the drawings, and said grooves communicate with slots or notches, 16, formed about midway between the ends of the bushing; the grooves 15 are for the accommodation of wicks, 17, which will thus be disposed contiguous to the shaft extending through the bushing, and said wicks are doubled to form loops, 18, extending through the notches 16 into the oil chamber or receptacle 2, from which the lubricant is fed by said wicks to the shaft bearing, as will be readily understood. The adjustment and removal of the bushing is effected by means of an ordinary spanner-wrench, not shown in the drawings, and the members of the bushing are provided with recesses, 26, for engagement with such wrench.

The operation and advantages of this invention will be readily understood from the foregoing description taken in connection with the drawings hereto annexed. The bushing may be readily applied to the properly constructed hub of a loose pulley, or to the box of a shaft hanger, or to some other appropriate bearing member. Oil is supplied through the aperture 11 and is fed to the entire length of the bearing by means of the wicks 17, and the bearing will thus be kept constantly lubricated in a simple and economical manner, waste or profligate use of the lubricating material being avoided. The bushing, when worn out, may be easily removed and replaced by a new one without removing the pulley from the shaft, or the latter from its bearing, as the case may be, owing to its construction of separable parts or members, as herein described.

Owing to the construction, as herein described, the wicks may be very readily placed in position, or renewed, as occasion may demand.

Having thus described my invention, I claim and desire to secure by Letters Patent of the United States:

1. A hub having an interior annular recess constituting a lubricant receptacle, and a bushing fitted in the hub, said bushing being composed of separable parts or members, and said bushing being provided with interior longitudinal grooves and slots communicating therewith, and wicks fitted in the grooves and having loops extending through the slots into the lubricant receptacle.

2. A hub having an interior annular recess constituting a lubricant receptacle said hub being interiorly threaded at one end and provided with a shoulder or offset near its other end, a bushing fitted in the hub and having a threaded portion engaging the threaded portion of the hub and an annular collar engaging the shoulder or offset of the hub, said bushing being composed of separable parts or members, and said bushing being provided with interior longitudinal grooves and slots communicating therewith, and wicks fitted in the grooves and having loops extending through the slots into the lubricant receptacle.

3. A self lubricating shaft bearing comprising, in combination with a casing, such as the hub of a pulley, cored to form a lubricant receptacle and having a filling aperture connected therewith and a plug for said aperture, a longitudinally divided two-part bushing threaded into the casing, said bushing being provided with interior longitudinal grooves and slots communicating therewith, a shaft extending through the bushing, and wicks extending through the grooves and slots into the lubricant receptacle.

4. A lubricating bushing, longitudinally divided to form separable approximately semi-cylindrical parts or members, said bushing being exteriorly threaded at one end and provided near its other end with an annular collar, the members of the bushing being provided at their edges with interengaging pins and recesses, and said members being provided along their inner edges with wick-receiving grooves, and notches communicating with said grooves intermediate the ends of the bushing.

5. A longitudinally divided bushing comprising a plurality of members combining to form an approximately cylindrical box or casing, said members being provided with grooves along their inner edges and the notches formed in the meeting edges intermediate the ends of the members and extending from the grooves to the exterior surfaces of said members, in combination with wicks seated in the grooves and having portions that extend through the notches.

In testimony whereof I affix my signature in presence of two witnesses.

CRISTIAN ALFRED PETERSEN.

Witnesses:
 WILLIAM W. THOMPSON,
 DANIEL A. SWEATT.